(12) United States Patent
Itatsu et al.

(10) Patent No.: US 9,849,908 B2
(45) Date of Patent: Dec. 26, 2017

(54) ELECTRIC POWER STEERING SYSTEM

(71) Applicant: JTEKT CORPORATION, Osaka-shi, Osaka (JP)

(72) Inventors: Yoshihiro Itatsu, Kashihara (JP); Sadanao Baba, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 106 days.

(21) Appl. No.: 15/080,746

(22) Filed: Mar. 25, 2016

(65) Prior Publication Data

US 2016/0288822 A1 Oct. 6, 2016

(30) Foreign Application Priority Data

Mar. 31, 2015 (JP) ................................. 2015-073245

(51) Int. Cl.
*B62D 5/04* (2006.01)
*H02P 6/08* (2016.01)
*H02P 6/28* (2016.01)

(52) U.S. Cl.
CPC .......... *B62D 5/046* (2013.01); *B62D 5/0463* (2013.01); *B62D 5/0481* (2013.01); *H02P 6/08* (2013.01); *H02P 6/28* (2016.02)

(58) Field of Classification Search
CPC A47L 11/4011; A47L 11/4066; A47L 9/2857; A47L 9/2894; A47L 9/2826;
(Continued)

(56) References Cited

U.S. PATENT DOCUMENTS 5,448,154 A * 9/1995 Kanke ..................... H02J 7/245
322/22
5,522,486 A * 6/1996 Fulks ......................... F16F 9/34
188/286

(Continued)

FOREIGN PATENT DOCUMENTS

EP 1955926 A2 8/2008
JP 2010-126081 A 6/2010

OTHER PUBLICATIONS

Aug. 26, 2016 Search Report issued in European Patent Application No. 16162604.9.

*Primary Examiner* — Rodney Butler
*Assistant Examiner* — Frederick Brushaber
(74) *Attorney, Agent, or Firm* — Oliff PLC

(57) ABSTRACT

An assist command value calculation circuit includes a torque shift control circuit, a phase lag compensation control circuit, a basic assist control circuit, and a phase lead compensation control circuit. A determination circuit determines whether a motor has been continuously under high load or not based on a current command value and a current limit value. The determination circuit determines whether the motor has been continuously under high load or not by comparing the current command value with the current limit value and comparing a basic assist controlled variable with the current limit value, and outputs a phase compensation restriction flag. The phase lag compensation control circuit and the phase lead compensation control circuit restrict phase restriction when the phase compensation restriction flag is ON, and continues phase compensation when the phase compensation restriction flag is OFF.

6 Claims, 10 Drawing Sheets

(58) Field of Classification Search
CPC .... A47L 2201/06; G05D 1/0246; G05D 1/0022;
G05D 2201/0203; G08C 17/02; G08C
2201/30; G08C 2201/51; H04Q 9/00
See application file for complete search history.

(56) References Cited

U.S. PATENT DOCUMENTS

| | | | | |
|---|---|---|---|---|
| 5,694,888 A * | 12/1997 | de Lima | ................ | F02B 43/00 123/1 A |
| 6,266,591 B1 * | 7/2001 | Wilson-Jones | ...... | B62D 5/0463 180/421 |
| 6,691,818 B2 * | 2/2004 | Endo | ................ | B62D 5/0463 180/443 |
| 6,744,232 B2 * | 6/2004 | Endo | ................ | B62D 5/046 318/432 |
| 6,876,910 B2 * | 4/2005 | Kifuku | ................ | B62D 5/0466 180/443 |
| 7,725,227 B2 * | 5/2010 | Pattok | ................ | B62D 5/0472 180/443 |
| 7,826,950 B2 * | 11/2010 | Tamaizumi | .......... | B62D 5/0463 180/443 |
| 2006/0214644 A1 * | 9/2006 | Okahara | ................ | H02P 9/006 322/23 |
| 2008/0024080 A1 * | 1/2008 | Ogawa | ................ | B62D 5/04 318/432 |
| 2008/0303465 A1 * | 12/2008 | Watanabe | ............... | H02P 23/14 318/434 |
| 2008/0319594 A1 * | 12/2008 | Shibata | ................ | B60K 6/485 701/22 |
| 2009/0146615 A1 * | 6/2009 | Zillmer | ................ | B60K 6/48 322/23 |
| 2010/0248055 A1 * | 9/2010 | Imanishi | .......... | H01M 8/04552 429/432 |
| 2012/0226403 A1 * | 9/2012 | Yamamoto | ............. | B60K 6/445 701/22 |
| 2012/0296505 A1 * | 11/2012 | Igarashi | ................ | B60L 3/0053 701/22 |

* cited by examiner

ELECTRIC POWER STEERING SYSTEM

INCORPORATION BY REFERENCE

The disclosure of Japanese Patent Application No. 2015-073245 filed on Mar. 31, 2015 including the specification, drawings and abstract, is incorporated herein by reference in its entirety.

BACKGROUND OF THE INVENTION

1. Field of the Invention

The invention relates to electric power steering systems.

2. Description of the Related Art

Conventionally, electric power steering systems (EPSs) are known in the art which assist driver's steering operation by applying power of a motor to a steering mechanism of a vehicle. In such EPSs, if the driver operates a steering wheel so that a rack end continuously hits a housing or the motor is continuously driven with high power, the motor may be continuously subjected to high load, which may cause overheating of the motor etc. For example, in an EPS of Japanese Patent Application Publication No. 2010-126081 (JP 2010-126081 A), a current command value for the motor is limited in order to prevent overheating.

When the current command value is being limited in the EPS of JP 2010-126081 A, appropriate assist control cannot be performed even when the driver turns back a steering wheel. The driver therefore feels unsmoothness in steering operation. The driver has this feeling of unsmoothness as an actual assist force becomes different from a target assist force due to the limitation of the current command value. That is, since the actual assist force does not quickly follow target assist force, the driver feels a rapid change in steering feeling.

SUMMARY OF THE INVENTION

It is one object of the present invention to provide an electric power steering system that allows an actual assist force to follow a target assist force more quickly.

According to one aspect of the present invention, an electric power steering system includes: an assist mechanism that applies an assist force to a steering mechanism by using a motor as a driving source; and a control device that calculates a current command value for the motor based on steering torque detected by a torque sensor disposed on a shaft that rotates according to a steering operation, and limits the current command value when an absolute value of the current command value is larger than a current limit value that is set based on a current value of the motor at the time the motor is under high load. The control device includes a phase compensation circuit that calculates a compensation value, or correction torque after phase compensation, by carrying out phase compensation of the steering torque, and compensates for the current command value. The control device restricts the phase compensation when the current command value is limited.

According to this configuration, followability of the current command value is improved by restricting the phase compensation of the current command value when the current command value is limited. This allows an actual assist force of the motor to match a target assist force more quickly.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
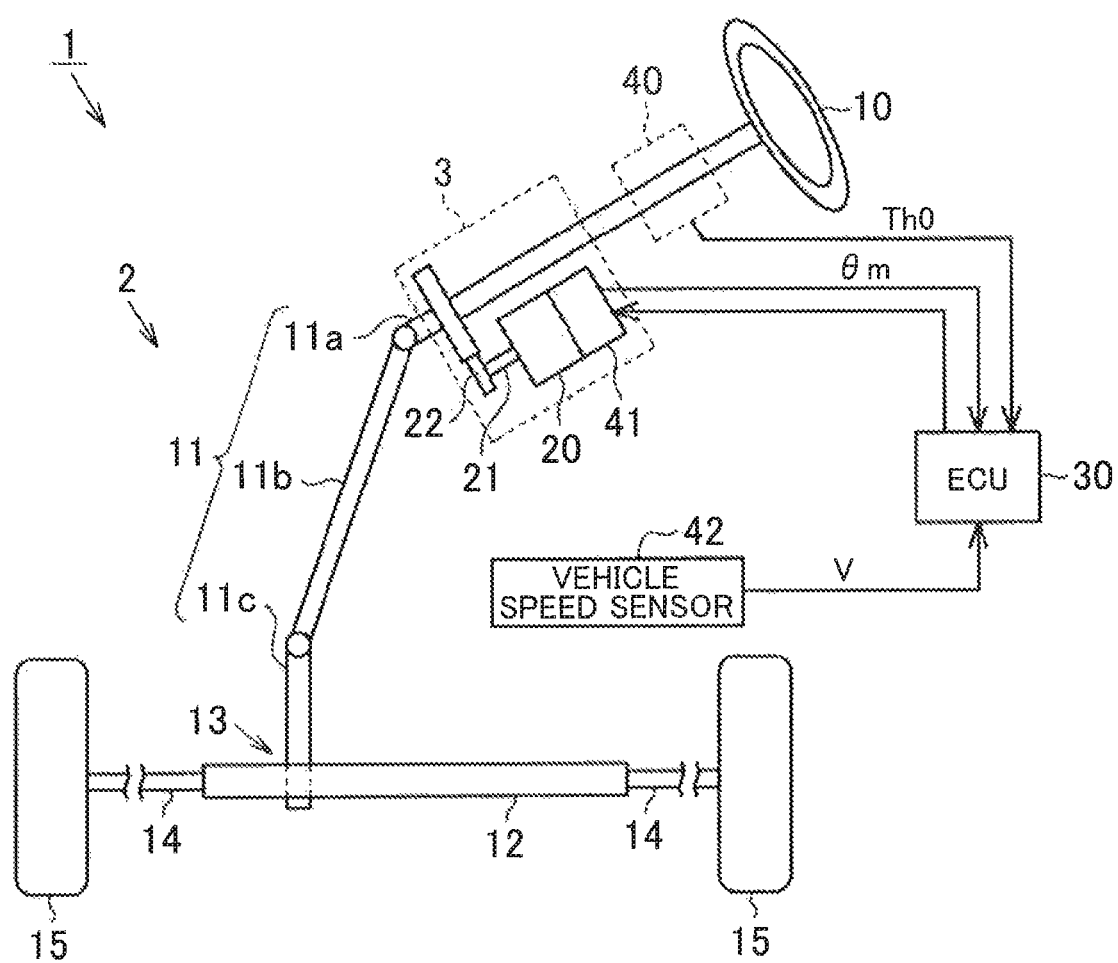
FIG. 1 is a configuration diagram showing the configuration of an electric power steering system.

One embodiment of an electric power steering system will be described below. As shown in FIG. 1, an EPS 1 includes a steering mechanism 2 that steers steered wheels 15 based on driver's operation of a steering wheel 10, an assist mechanism 3 that assists driver's steering operation, and an electronic control unit (ECU) 30 that controls the assist mechanism 3.

The steering mechanism 2 includes the steering wheel 10 and a steering shaft 11 that rotates together with the steering wheel 10. The steering shaft 11 has a column shaft 11a coupled to the steering wheel 10, an intermediate shaft 11b coupled to the lower end of the column shaft 11a, and a pinion shaft 11c coupled to the lower end of the intermediate shaft 11b. The lower end of the pinion shaft 11c is coupled to a rack shaft 12 via a rack and pinion mechanism 13. Accordingly, the rotary motion of the steering shaft 11 in the steering mechanism 2 is converted to a reciprocating linear motion of the rack shaft 12 in the axial direction (the lateral direction in FIG. 1) via the rack and pinion mechanism 13. The rack and pinion mechanism 13 is formed by a pinion gear at the tip end of the pinion shaft 11c and a rack of the rack shaft 12. The reciprocating linear motion is transmitted to the right and left steered wheels 15 via tie rods 14 coupled to both sides of the rack shaft 12, whereby the steered angle of the steered wheels 15 is changed.

The assist mechanism 3 includes a motor 20 as a source of an assist force. A rotary shaft 21 of the motor 20 is coupled to the column shaft 11a via a speed reducer 22. The speed reducer 22 reduces the rotational speed of the motor 20 and transmits the resultant rotational force to the column shaft 11a. That is, the rotational force (torque) of the motor 20 is applied as an assist force to the steering shaft 11, whereby driver's steering operation is assisted. An example of the motor 20 is a three-phase brushless motor that rotates based on three-phase (U, V, W) driving power.

The ECU 30 controls the motor 20 based on the detection results of various sensors mounted on a vehicle. For example, the various sensors include a torque sensor 40, a rotation angle sensor 41, and a vehicle speed sensor 42. The torque sensor 40 is disposed on the column shaft 11$a$, and the rotation angle sensor 41 is disposed on the motor 20. The torque sensor 40 detects steering torque Th0 applied to the steering shaft 11 according to driver's steering operation. The rotation angle sensor 41 detects the rotation angle θm of the rotary shaft 21. The vehicle speed sensor 42 detects the vehicle speed V, or the traveling speed of the vehicle. The ECU 30 sets a target assist force based on the output of each sensor, and controls a current to be supplied to the motor 20 so that an actual assist force becomes equal to the target assist force.

Figure 2:
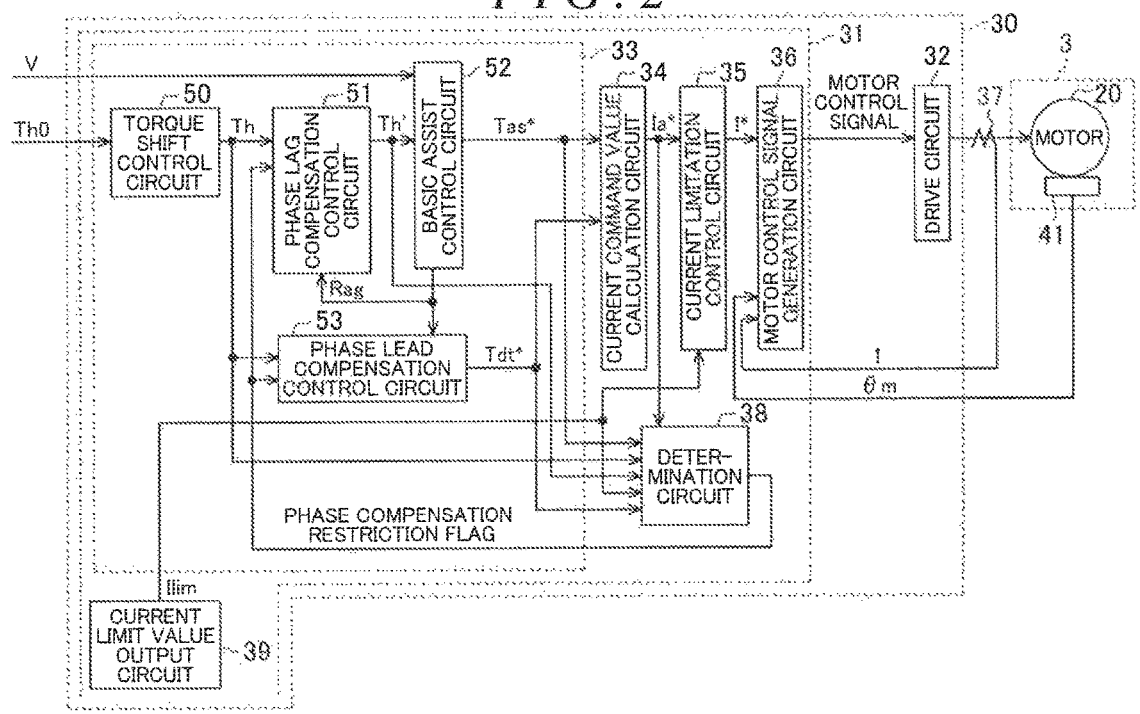
FIG. 2 is a block diagram showing the general configuration of a control device of the electric power steering system.

The configuration of the ECU will be described in detail. As shown in FIG. 2, the ECU 30 includes a microcomputer 31 and a drive circuit 32. The microcomputer 31 outputs a motor control signal to the drive circuit 32, and the drive circuit 32 supplies driving power to the motor 20 based on the motor control signal.

The microcomputer 31 includes an assist command value calculation circuit 33, a current command value calculation circuit 34, a current limitation control circuit 35, a motor control signal generation circuit 36, a determination circuit 38, and a current limit value output circuit 39. The assist command value calculation circuit 33 calculates a basic assist controlled variable Tas* and a system stabilization controlled variable Tdt* corresponding to assist torque to be applied to the motor 20 based on the steering torque Th0 and the vehicle speed V received from the torque sensor 40 and the vehicle speed sensor 42. The current command value calculation circuit 34 calculates a current command value Ia* based on the basic assist controlled variable Tas* and the system stabilization controlled variable Tdt*. If the current command value Ia* is larger than a certain threshold (a current limit value Ilim at the time the motor 20 is continuously under high load) for a certain period of time, the current limitation control circuit 35 limits the current command value Ia* to output the limited current command value Ia*. The current limit value output circuit 39 outputs the prestored current limit value Ilim to the current limitation control circuit 35 and the determination circuit 38. The motor control signal generation circuit 36 generates a motor control signal so as to cause an actual current value I to follow the current command value I*, based on the actual current value I detected by a current sensor 37 and the rotation angle θm detected by the rotation angle sensor 41. The current sensor 37 is disposed on a power supply path between the drive circuit 32 and the assist mechanism 3. The current limit value Ilim is set based on the actual current value I at the time the motor 20 is under high load.

The assist command value calculation circuit 33 will be described specifically. The assist command value calculation circuit 33 includes a torque shift control circuit 50, a phase lag compensation control circuit 51, a basic assist control circuit 52, and a phase lead compensation control circuit 53.

The torque shift control circuit 50 calculates correction torque Th by correcting the steering torque Th0 detected by the torque sensor 40 based on the steering state of the steering wheel 10, in order to improve steering feeling. Specifically, the torque shift control circuit 50 calculates the correction torque Th so that the steering torque Th0 increases when the position of the steering wheel 10 is being retained by the driver or when the steering wheel 10 is being turned back, and calculates the correction torque Th so that the amount of correction of the steering torque Th0 is set to zero when the steering wheel 10 is being turned.

The phase lag compensation control circuit 51 retards the phase of the correction torque Th received from the torque shift control circuit 50. The basic assist control circuit 52 calculates the basic assist controlled variable Tas* as a basic component of an assist command value corresponding to the current command value Ia*, based on correction torque Th' after phase lag compensation by the phase lag compensation control circuit 51 and the vehicle speed V. The phase lead compensation control circuit 53 calculates the system stabilization controlled variable Tdt* as a compensation component based on a differential value of the correction torque Th (a correction torque differential value dTh) by advancing the phase of the correction torque Th.

Figure 3:
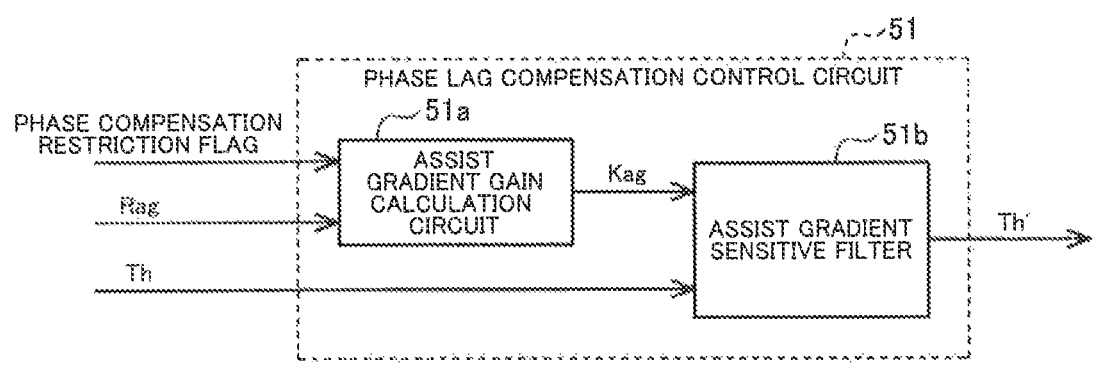
FIG. 3 is a block diagram showing the general configuration of a phase lag compensation control circuit of the electric power steering system.

As shown in FIG. 3, the phase lag compensation control circuit 51 includes an assist gradient gain calculation circuit 51$a$ and an assist gradient sensitive filter 51$b$. The assist gradient gain calculation circuit 51$a$ calculates an assist gradient gain Kag based on a phase compensation restriction flag and an assist gradient Rag which will be described below. The assist gradient sensitive filter 51$b$ changes characteristics (a filter coefficient etc.) of phase lag compensation based on the assist gradient Rag. The larger the absolute value of the assist gradient Rag received from the basic assist control circuit 52 is, the smaller the assist gradient gain Kag that is calculated by the phase lag compensation control circuit 51 is. The assist gradient gain Kag is a value that is set in the range of 0 to 1.0.

Figure 4:
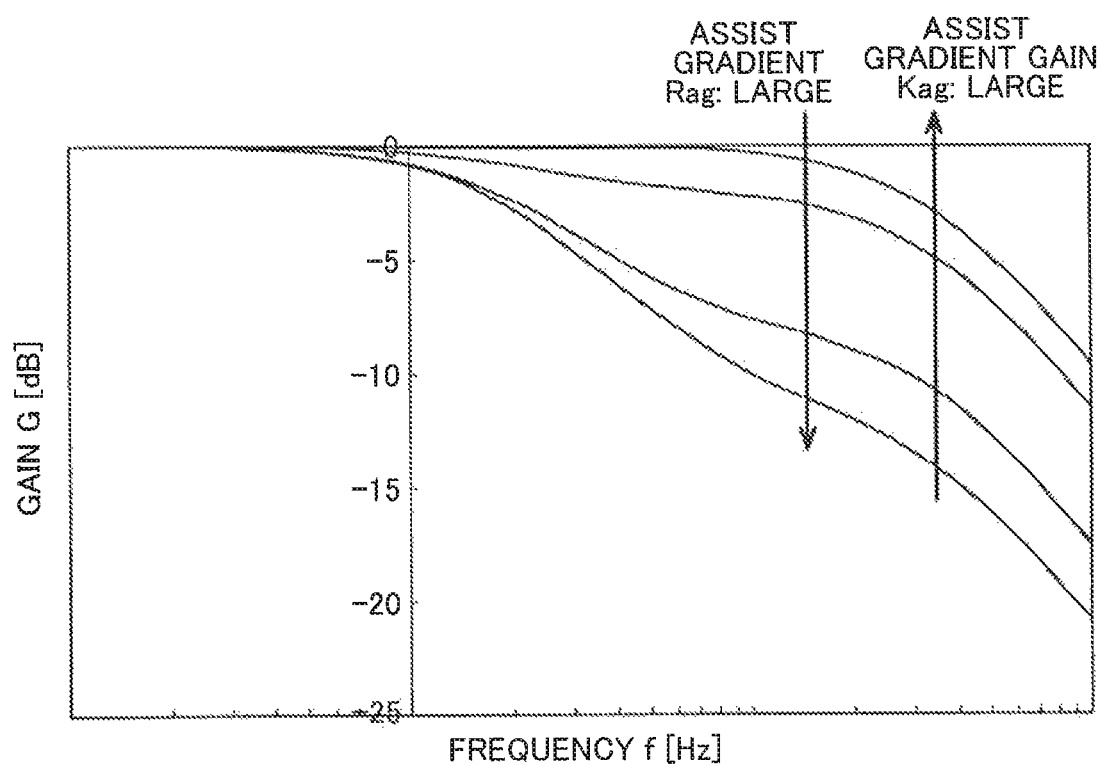
FIG. 4 is a graph illustrating phase lag compensation control based on an assist gradient.

As shown in the graph of FIG. 4, the assist gradient sensitive filter 51$b$ selects a filter with a different gain G for each frequency f selected according to the assist gradient Rag (the assist gradient gain Kag) to carry out phase lag compensation. The gain G is the ratio of output to input of the assist gradient sensitive filter 51$b$, namely the ratio of the correction torque Th' after phase lag compensation to the correction torque Th before phase lag compensation. The phase lag compensation control circuit 51 changes characteristics (the gain G etc.) of phase lag compensation so that the phase of the correction torque Th' after phase lag compensation (a first compensation value) is retarded (the gain is reduced) as the assist gradient Rag increases (as the assist gradient gain Kag decreases).

Figure 5:
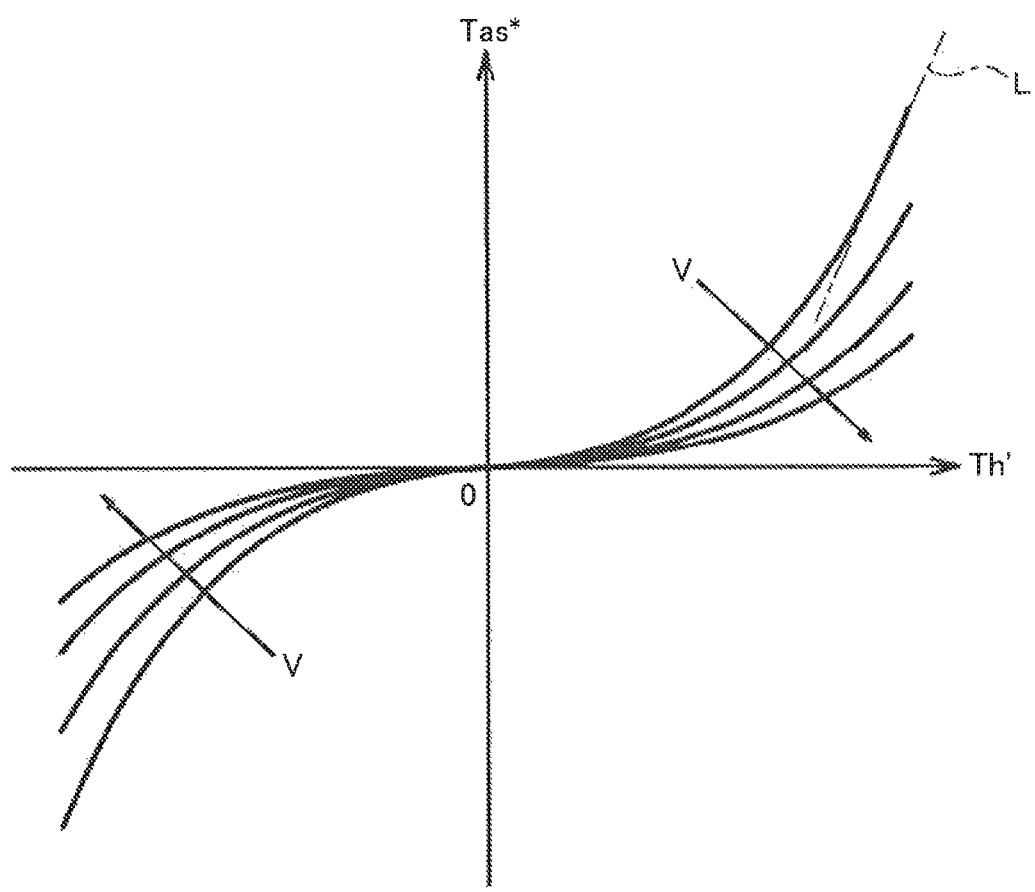
FIG. 5 is a graph showing the relationship between a basic assist controlled variable and an assist gradient.

As shown in the graph of FIG. 5, the larger the absolute value of the correction torque Th' after phase lag compensation is, or the lower the vehicle speed V is, the larger the absolute value of the basic assist controlled variable Tas* that is calculated by the basic assist control circuit 52 is. The basic assist control circuit 52 is designed so that the larger the absolute value of the correction torque Th' after phase lag compensation is, the larger the absolute value of the assist gradient Rag is. The assist gradient Rag is the rate of change in basic assist controlled variable Tas* with respect to change in correction torque Th' after phase lag compensation. For example, the assist gradient Rag is the slope of a tangent L shown in FIG. 5.

Figure 6:
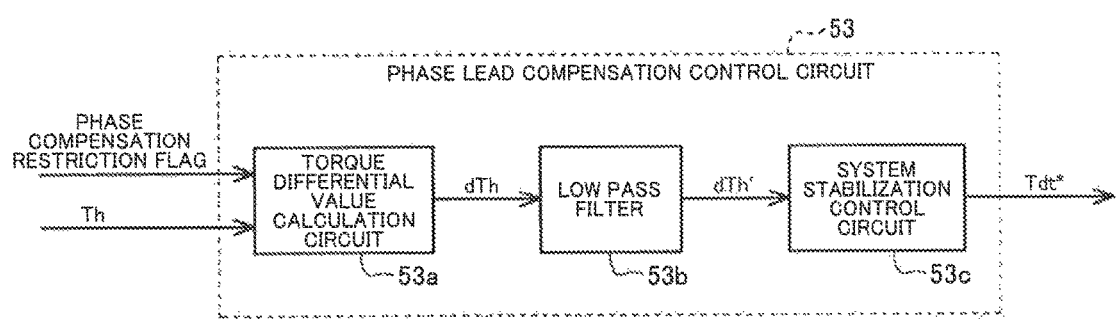
FIG. 6 is a block diagram showing the general configuration of a phase lead compensation control circuit of the electric power steering system.

As shown in FIG. 6, the phase lead compensation control circuit 53 has a torque differential value calculation circuit 53$a$, a low pass filter 53$b$, and a system stabilization control circuit 53$c$. The torque differential value calculation circuit 53$a$ calculates the correction torque differential value dTh based on the received phase compensation restriction flag and the received correction torque Th. The low pass filter 53$b$ carries out low pass filtering of the correction torque differential value dTh received from the torque differential value calculation circuit 53$a$ to output a filtered correction torque differential value dTh' (a second compensation value, namely correction torque after phase lead compensation). The system stabilization control circuit 53c calculates the system stabilization controlled variable Tdt* based on the filtered correction torque differential value dTh' and the assist gradient Rag. The larger the absolute value of the filtered correction torque differential value dTh' is, the larger the absolute value of the system stabilization controlled variable Tdt* that is calculated by the system stabilization control circuit 53c is.

The determination circuit 38 determines whether the motor 20 has been continuously under high load or not based on the current command value Ia* when the phase lag compensation control circuit 51 is carrying out phase lag compensation and the phase lead compensation control circuit 53 is carrying out phase lead compensation. The determination circuit 38 outputs the phase compensation restriction flag according to the state where the motor 20 has been continuously under high load, etc. That is, the determination circuit 38 determines whether the motor 20 has been continuously under high load or not by comparing the current command value Ia* with the current limit value Ilim and comparing the basic assist controlled variable Tas* with the current limit value Ilim. Since the current limit value Ilim is a current value, the determination circuit 38 compares the basic assist controlled variable Tas* converted to a current value with the current limit value Ilim. In the case where the current command value Ia* is being limited by the current limitation control circuit 35, the determination circuit 38 outputs the phase compensation restriction flag to the phase lag compensation control circuit 51 and the phase lead compensation control circuit 53. The phase lag compensation control circuit 51 and the phase lead compensation control circuit 53 restrict phase compensation (phase lag compensation, phase lead compensation) if the phase compensation restriction flag is ON, and continues phase compensation if the phase compensation restriction flag is OFF.

The determination circuit 38 is also provided in order to reduce uncomfortable feeling of the driver and restrain fluctuations in torque under special conditions. For example, if the phase compensation restriction flag is output to the phase lag compensation control circuit 51 when the current command value Ia* is being limited, the correction torque Th' after phase lag compensation may change rapidly. In this case, the basic assist controlled variable Tas* also changes rapidly. If the phase compensation restriction flag that is output to the phase lead compensation control circuit 53 repeatedly switches between ON and OFF when the current command value Ia* is being limited, the system stabilization controlled variable Tdt* after phase lead compensation may fluctuate. Specifically, such disadvantageous situations in the phase lag compensation control circuit 51 and the phase lead compensation control circuit 53 occur when the current command value Ia* is close to the current limit value Ilim.

Operation of the assist gradient gain calculation circuit 51a will be described below.

Figure 7:
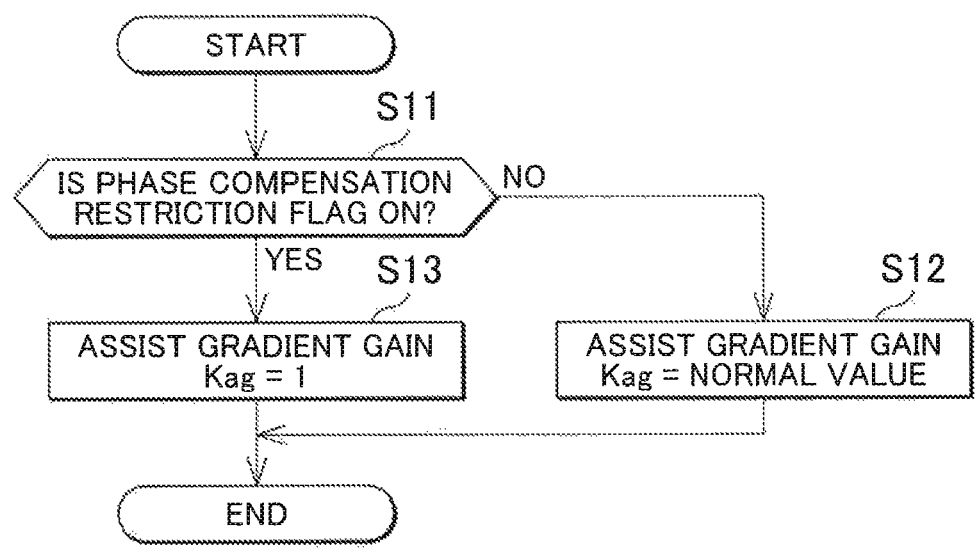
FIG. 7 is a flowchart showing the procedure of calculating an assist gradient gain of an assist gradient gain calculation circuit when a phase compensation restriction flag is input.

As shown in the flowchart of FIG. 7, the assist gradient gain calculation circuit 51a first determines if the received phase compensation restriction flag is ON (step S11). If the phase compensation restriction flag is OFF, the assist gradient gain calculation circuit 51a outputs a normal assist gradient gain Kag (a normal value) (step S12), and the process is terminated. The normal assist gradient gain Kag is a value that varies according to the absolute value of the received assist gradient Rag. If the phase compensation restriction flag is ON, the assist gradient gain calculation circuit 51a outputs the assist gradient gain Kag of 1 (step S13), and the process is terminated.

Figure 8:
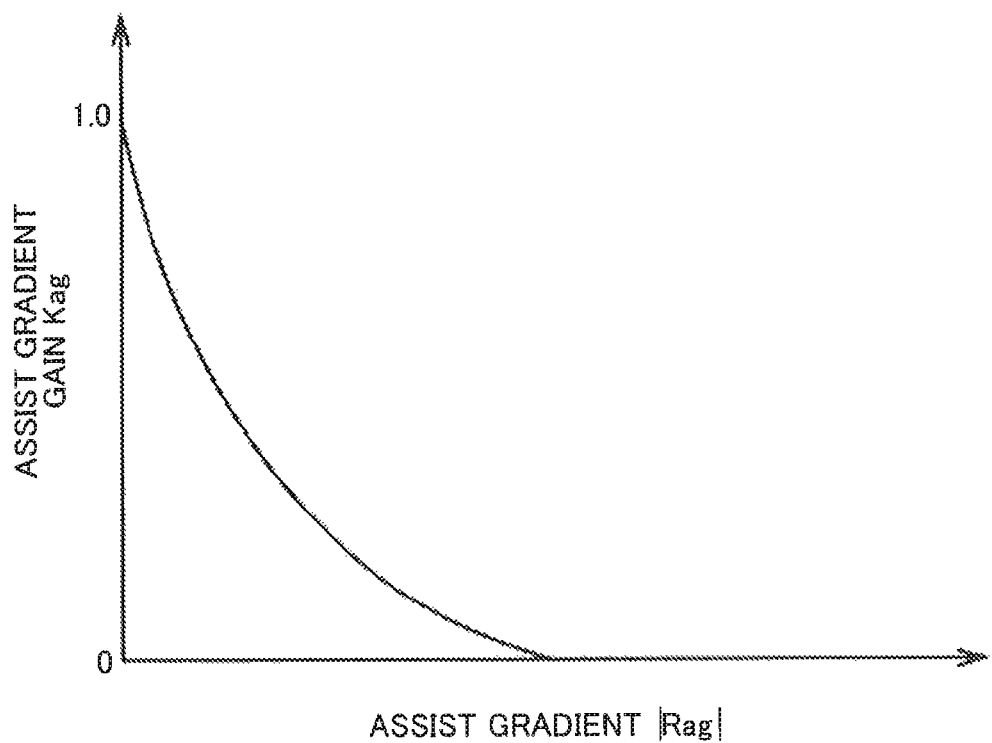
FIG. 8 is a graph showing the relationship between the assist gradient and the assist gradient gain.

The relationship between the assist gradient gain Kag and the assist gradient Rag is as shown in the graph of FIG. 8. That is, the assist gradient gain Kag is a value that is set in the range of 0 to 1.0 so as to be inversely proportional to the assist gradient Rag. When the assist gradient gain Kag is 1, the assist gradient Rag is zero. As shown in FIG. 4, as the assist gradient Rag becomes closer to zero (as the assist gradient gain Kag becomes closer to 1), the assist gradient sensitive filter 51b therefore carries out phase lag compensation by using such a filter that the gain G is almost 1 regardless of the frequency f. Accordingly, when the assist gradient Rag is zero (the assist gradient gain Kag is 1), the correction torque Th that is input to the assist gradient sensitive filter 51b is the same as the correction torque Th' after phase lag compensation which is output from the assist gradient sensitive filter 51b. The control process of performing the operation of the assist gradient sensitive filter 51b with the assist gradient gain Kag of 1 is equivalent to not carrying out phase lag compensation. Since phase retardation of the correction torque Th' after phase lag compensation is restrained, followability of the correction torque Th' after phase lag compensation is improved.

Figure 9:
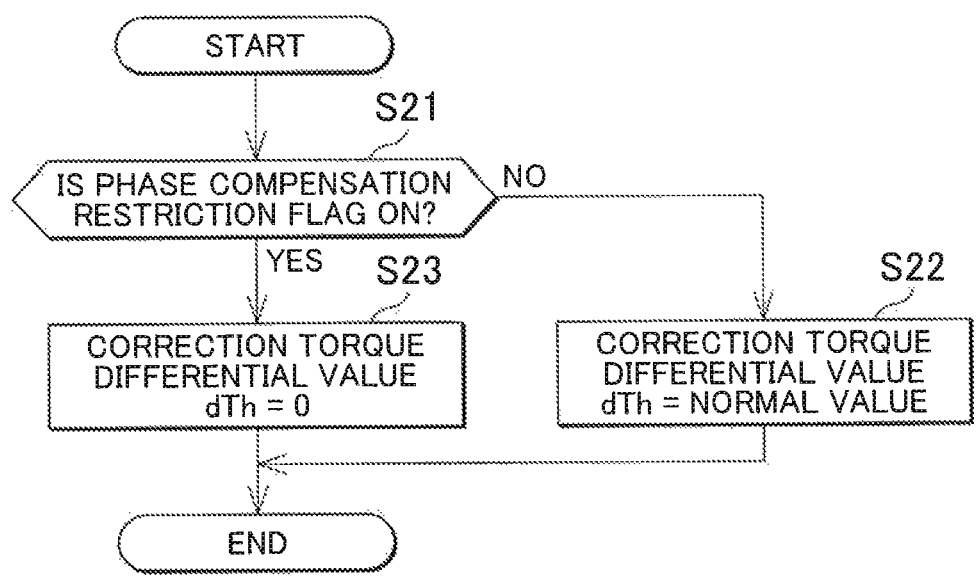
FIG. 9 is a flowchart showing the procedure of calculating a shift torque differential value of a torque differential control circuit when the phase compensation restriction flag is input.

Operation of the torque differential value calculation circuit 53a will be described. As shown in FIG. 9, the torque differential value calculation circuit 53a first determines if the received phase compensation restriction flag is ON (step S21). If the phase compensation restriction flag is OFF, the torque differential value calculation circuit 53a outputs a normal correction torque differential value dTh (step S22), and the process is terminated. If the phase compensation restriction flag is ON, the torque differential value calculation circuit 53a outputs the correction torque differential value dTh of zero (step S23), and the process is terminated.

If the torque differential value calculation circuit 53a outputs the correction torque differential value dTh of zero, the process in the low pass filter 53b is not performed substantially. That is, if the correction torque differential value dTh is zero, the filtered correction torque differential value dTh' is also zero. The low pass filter 53b hardly changes frequency characteristics of low frequency components of an input value, and outputs the lower frequency components of the input value as they are. Accordingly, frequency characteristics such as the phase of the correction torque differential value dTh do not change through the process of the low pass filter 53b. Followability of the correction torque differential value dTh of the assist gradient sensitive filter 51b is thus improved as the actual current value I follows the current command value Ia*.

Figure 10:
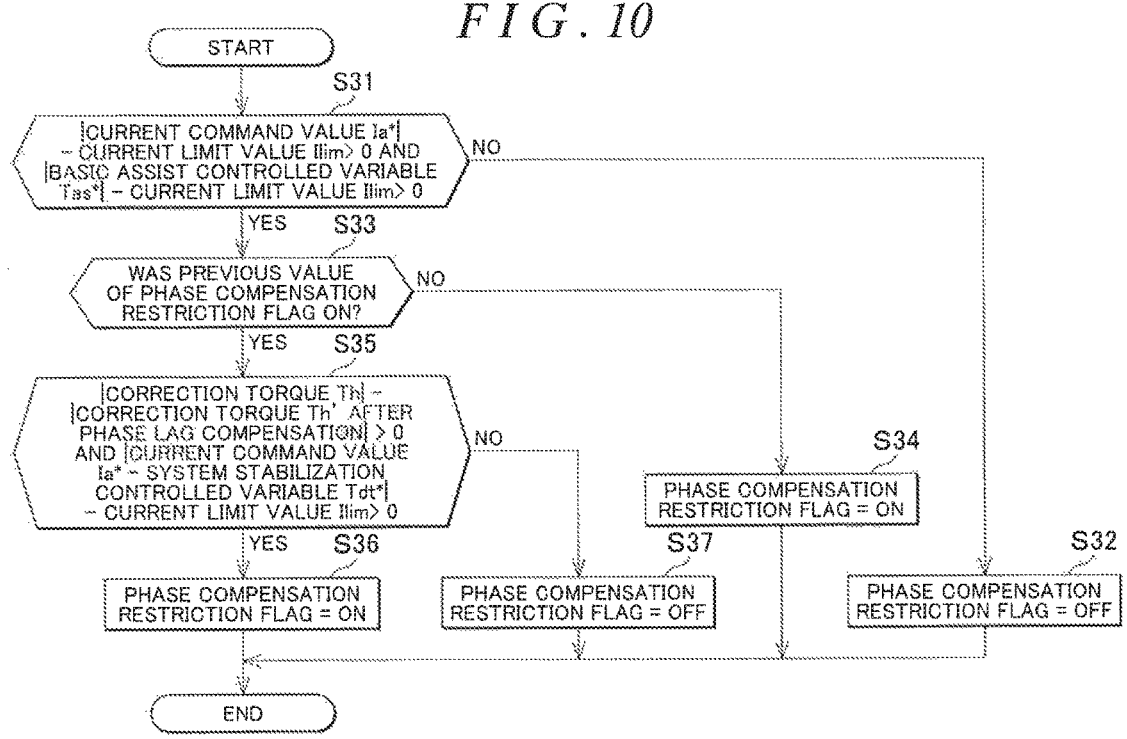
FIG. 10 is a flowchart showing the procedure of determining whether the phase compensation restriction flag should be ON or OFF.

A method for determining whether the phase compensation restriction flag should be ON or OFF will be described. The determination circuit 38 determines whether the phase compensation restriction flag should be ON or OFF according to the procedure shown in the flowchart of FIG. 10. The determination circuit 38 determine whether the phase compensation restriction flag should be ON or OFF by using the basic assist controlled variable Tas*, the correction torque Th, the correction torque Th' after phase lag compensation, and the system stabilization controlled variable Tdt*, each converted to a current value.

First, the determination circuit 38 determines if the difference between the absolute value of the current command value Ia* and the current limit value Ilim is larger than zero and if the difference between the absolute value of the basic assist controlled variable Tas* and the current limit value Ilim is larger than zero (step S31).

If both the difference between the absolute value of the current command value Ia* and the current limit value Ilim and the difference between the absolute value of the basic assist controlled variable Tas* and the current limit value Ilim are equal to or smaller than zero (NO in step S31), the determination circuit 38 sets the phase compensation restriction flag to OFF (step S32), and the process is terminated. At this time, phase lag compensation and phase lead compensation are continued. Namely, in the case where the first and second conditions of step S31 are not satisfied, this current command value Ia* does not indicate the high load state. Accordingly, an actual assist force of the motor 20 is less likely to become significantly different from a target assist force even if phase lag compensation and phase lead compensation is not restricted. Improvement in followability of the actual current value I to the current command value Ia* is less likely to be required.

On the other hand, if the difference between the absolute value of the current command value Ia* and the current limit value Ilim is larger than zero, the current command value Ia* is larger than the current limit value Ilim. Namely, the current command value Ia* indicates the high load state. If the difference between the absolute value of the basic assist controlled variable Tas* and the current limit value Ilim is larger than zero, the current command value Ia* fluctuates due to noise or various compensation controls, and the phase compensation restriction flag repeatedly switches between ON and OFF. Accordingly, if both the difference between the absolute value of the current command value Ia* and the current limit value Ilim and the difference between the absolute value of the basic assist controlled variable Tas* and the current limit value Ilim are larger than zero (YES in step S31), the routine proceeds to step S33. In step S33, the determination circuit 38 determines if the previous (in the previous period) phase compensation restriction flag was ON. The phase compensation restriction flag is usually OFF in an initial state. If the previous phase compensation restriction flag was OFF (NO in step S33), the phase compensation restriction flag is set to ON (step S34), and the process is terminated. That is, phase lag compensation and phase lead compensation are restricted by setting the phase compensation restriction flag to ON. This improves followability of the actual current value Ito the current command value Ia*.

If the previous phase compensation restriction flag was ON in step S33 (YES in step S33), the routine proceeds to step S35. In step S35, the determination circuit 38 determines if the difference between the absolute value of the correction torque Th and the absolute value of the correction torque Th' after phase lag compensation is larger than zero and if the difference between the absolute value of the difference between the current command value Ia* and the system stabilization controlled variable Tdt* and the current limit value Ilim is larger than zero. The condition of whether the difference between the absolute value of the correction torque Th and the absolute value of the correction torque Th' after phase lag compensation is larger than zero or not is provided in order to restrain a sudden change in basic assist controlled variable Tas* due to restriction of phase lag compensation. The condition of whether the difference between the absolute value of the difference between the current command value Ia* and the system stabilization controlled variable Tdt* and the current limit value Ilim is larger than zero or not is provided in order to restrain fluctuations of the actual assist force of the motor 20 due to repeated switching of the phase compensation restriction flag between ON and OFF caused by restriction of phase lead compensation.

For example, if the difference between the absolute value of the correction torque Th and the absolute value of the correction torque Th' after phase lag compensation is equal to or smaller than zero, it is considered that the correction torque Th has changed suddenly due to restriction of phase lag compensation. If the absolute value of the correction torque Th is larger than the correction torque Th' after phase lag compensation even though the correction torque Th has been processed in the assist gradient sensitive filter 51b by phase lag compensation, this is not considered to be a normal operation. Since the previous phase compensation restriction flag was ON, this is considered to be due to the previous phase lag compensation and the previous phase lead compensation. Specifically, it is considered that the situation where the current limit value Ilim and the current command value Ia* are substantially the same has occurred. For example, this situation tends to occur when the operation status switches from the state where the current command value Ia* is limited to the state where the current command value Ia* is not limited. This situation tends to occur especially when the current limit value Ilim is decreasing gradually.

If the difference between the absolute value of the difference between the current command value Ia* and the system stabilization controlled variable Tdt* and the current limit value Ilim is equal to or smaller than zero, it is considered that the current command value Ia* is fluctuating due to restriction of phase lead compensation. Specifically, it is considered that the situation has occurred where phase lead compensation is being repeatedly restricted and resumed. For example, this situation tends to occur when the operation status switches from the state where the current command value Ia* is limited to the state where the current command value Ia* is not limited.

Accordingly, if both the difference between the absolute value of the correction torque Th and the absolute value of the correction torque Th' after phase lag compensation and the difference between the absolute value of the difference between the current command value Ia* and the system stabilization controlled variable Tdt* and the current limit value Ilim are larger than zero (YES in step S35), the phase compensation restriction flag is kept ON (step S36), and the process is terminated. Phase lag compensation and phase lead compensation therefore continue to be restricted. If both the difference between the absolute value of the correction torque Th and the absolute value of the correction torque Th' after phase lag compensation and the difference between the absolute value of the difference between the current command value Ia* and the system stabilization controlled variable Tdt* and the current limit value Ilim are equal to or smaller than zero (NO in step S35), the phase compensation restriction flag is set to OFF (step S37), and the process is terminated. Phase lag compensation and phase lead compensation are thus carried out. This can restrain a sudden change in basic assist controlled variable Tas* and fluctuations in current command value Ia*.

The difference between the actual assist force of the motor 20 and the target assist force due to phase compensation will be described in detail below. For example, if the driver operates the steering wheel 10 so that a rack end continuously hits a housing, the current command value Ia* indicates the high load state, and the current command value Ia* is limited. If the driver turns back the steering wheel 10 in this state, he/she feels unsmoothness in steering operation.

The driver has this feeling of unsmoothness as the actual assist force of the motor 20 becomes different from the target assist force due to the limitation of the current command value Ia* by the current limitation control circuit 35. In the case where such a difference occurs, it is desired that the actual assist force quickly follow the target assist force. However, phase lag compensation and phase lead compensation degrades followability of the current command value Ia*. For example, if phase lag compensation is performed in the phase lag compensation control circuit 51, the correction torque Th' after phase lag compensation is behind the correction torque Th in phase. Accordingly, even if the correction torque Th is changed, the correction torque Th' after phase lag compensation does not quickly follow the correction torque Th. Accordingly, restricting phase lag compensation can improve followability of the correction torque Th' after phase lag compensation, and so that the actual assist force of the motor 20 can be made to match the target assist force more quickly.

Restriction of phase lag compensation and phase lead compensation by the phase lag compensation control circuit 51 and the phase lead compensation control circuit 53 will be described. In the phase lag compensation control circuit 51, the assist gradient gain calculation circuit 51a performs the operation shown in FIG. 7 when a signal indicating that the phase compensation restriction flag is ON is applied to the phase lag compensation control circuit 51. When the phase compensation restriction flag is ON, the assist gradient gain calculation circuit 51a sets the assist gradient gain Kag to 1 to substantially restrict phase lag compensation. In the phase lead compensation control circuit 53, the torque differential value calculation circuit 53a performs the operation shown in FIG. 9 when a signal indicating that the phase compensation restriction flag is ON is applied to the phase lead compensation control circuit 53. When the phase compensation restriction flag is ON, the torque differential value calculation circuit 53a outputs the correction torque differential value dTh of zero to substantially limit phase lead compensation.

Effects of the present embodiment will be described.

(1) When the difference between the absolute value of the current command value Ia* and the current limit value Ilim is larger than zero and the previous phase compensation restriction flag was OFF, the phase compensation restriction flag is set to ON to restrict phase lag compensation and phase lead compensation. This restriction of phase lag compensation and phase lead compensation improves followability of the correction torque Th, the correction torque Th' after phase lag compensation, and the system stabilization controlled variable Tdt* and improves followability of the current command value Ia*. The actual assist force of the motor 20 can thus be more quickly made to match the target assist force. The restriction of phase lag compensation and phase lead compensation can therefore restrain driver's feeling of unsmoothness in steering operation.

(2) Moreover, when the difference between the absolute value of the basic assist controlled variable Tas* and the current limit value Ilim is larger than zero and the previous phase compensation restriction flag was OFF, the phase compensation restriction flag is set to ON. This can restrain the phase compensation restriction flag from repeatedly switching between ON and OFF.

(3) It is determined whether the difference between the absolute value of the correction torque Th and the absolute value of the correction torque Th' after phase lag compensation is larger than zero or not and whether the difference between the absolute value of the difference between the current command value Ia* and the stabilization controlled variable Tdt* and the current limit value Ilim is larger than zero or not, and the phase compensation restriction flag is output. This can restrain a sudden change in basic assist controlled variable Tas* and fluctuations in current command value Ia* which are caused by carrying out phase compensation again when not desired in view of control stability.

(4) When the phase compensation restriction flag is input to the phase lag compensation control circuit 51 and the phase lead compensation control circuit 53, phase lag compensation and phase lead compensation are restricted by a simple process as shown in FIGS. 7 and 9. Phase lag compensation and phase lead compensation can be restricted by using such a simple process.

The present embodiment may be modified as follows.

In the present embodiment, the phase lag compensation control circuit 51 and the phase lead compensation control circuit 53 are provided in order to perform compensation control of the basic assist controlled variable Tas*. However, only one of the phase lag compensation control circuit 51 and the phase lead compensation control circuit 53 may be provided. The present invention is not limited to the phase lag compensation control circuit 51 and the phase lead compensation control circuit 53, and other compensation control circuits such as a damping control circuit may be provided.

In the present embodiment, the correction torque Th is output from the torque shift control circuit 50 to the phase lag compensation control circuit 51 and the phase lead compensation control circuit 53. However, the present invention is not limited to this. For example, the steering torque Th0 may be input to the phase lead compensation control circuit 53, and the phase lead compensation control circuit 53 may calculate the system stabilization controlled variable Tdt* based on the steering torque Th0. The torque shift control circuit 50 may not be provided, and phase lag compensation and phase lead compensation may be carried out by using the steering torque Th0.

In the present embodiment, the phase lead compensation control circuit 53 includes the torque differential value calculation circuit 53a to carry out phase lead compensation by using the correction torque differential value. However, the present invention is not limited to this. For example, phase lead compensation may be carried out by using the difference value of the correction torque.

In the present embodiment, the phase lead compensation control circuit 53 includes the low pass filter 53b. However, the present invention is not limited to this. For example, the phase lead compensation control circuit 53 may include, as necessary, a high pass filter that removes low frequency components of the correction torque differential value dTh.

In the present embodiment, the current limit value output circuit 39 outputs the current limit value Ilim stored therein to the current command value calculation circuit 34 and the determination circuit 38. However, the present invention is not limited to this. For example, the current limit value Ilim may vary according to the steering torque Th0 etc. In the case where the current limit value Ilim varies, the situation where phase lead compensation is being repeatedly restricted and resumed tends to occur when the current limit value Ilim is decreasing gradually.

In the present embodiment, the rotation angle sensor 41 detects the rotation angle θm of the rotary shaft 21 of the motor 20. However, the present invention is not limited to this. For example, the rotation angle sensor 41 may detect a pinion angle. In the present embodiment, the phase compensation restriction flag is input to the phase lag compensation control circuit 51 and the phase lead compensation control circuit 53 so that the phase compensation is not carried out substantially according to the procedure of FIGS. 7 and 9. However, the present invention is not limited to this. For example, when the phase compensation restriction flag is ON, electric power may not be supplied to the phase lead compensation control circuit 53 so as not to drive the phase lead compensation control circuit 53. Alternatively, for example, the system stabilization controlled variable Tdt* that is output from the phase lead compensation control circuit 53 may be reduced so that the phase compensation is not carried out substantially.

In the present embodiment, it is determined whether the difference between the absolute value of the current command value Ia* and the current limit value Ilim is larger than zero or not and whether the difference between the absolute value of the basic assist controlled variable Tas* and the current limit value Ilim is larger than zero or not. However, the present invention is not limited to this. For example, it may be determined whether the difference between the absolute value of the current command value Ia* and the current limit value Ilim is larger than a threshold or not and whether the difference between the absolute value of the basic assist controlled variable Tas* and the current limit value Ilim is larger than a threshold or not. In the case of using the threshold, for example, a change in current command value Ia* etc. can be permitted to some extent. The same applies to the determination of whether the difference between the absolute value of the correction torque Th and the absolute value of the correction torque Th' after phase lag compensation is larger than zero or not, and whether the difference between the absolute value of the difference between the current command value Ia* and the system stabilization controlled variable Tdt* and the current limit value Ilim is larger than zero or not.

In the present embodiment, whether the difference between the absolute value of the basic assist controlled variable Tas* and the current limit value Ilim is larger than zero or not is determined to determine whether to set the phase compensation restriction flag to ON. However, this determination (the second condition in step S31 of FIG. 10) is not necessarily required. In this case as well, followability of the current command value I* can be improved by restricting phase lag compensation and phase lead compensation when the current command value I* indicates high load. In the present embodiment, it is determined whether the difference between the absolute value of the correction torque Th and the absolute value of the correction torque Th' after phase lag compensation is larger than zero or not, and whether the difference between the absolute value of the difference between the current command value Ia* and the system stabilization controlled variable Tdt* and the current limit value Ilim is larger than zero or not. However, this determination (the second condition in step S35 of FIG. 10) is not necessarily required. In this case as well, followability of the current command value I* can be improved by restricting phase lag compensation and phase lead compensation when the current command value I* indicates high load.

In the present embodiment, a brushless motor is used as the motor 20. However, a motor with a brush may be used as the motor 20. Although a column assist electric power steering system is embodied in the present embodiment, the present invention is not limited to this. For example, a rack parallel electric power steering system may be embodied.

What is claimed is:

1. An electric power steering system, comprising:
   an assist mechanism that applies an assist force to a steering mechanism by using a motor as a driving source; and
   a control device that calculates a current command value for the motor based on steering torque detected by a torque sensor disposed on a shaft that rotates according to a steering operation, and limits the current command value when an absolute value of the current command value is larger than a current limit value that is set based on a current value of the motor at the time the motor is under high load, wherein,
   the control device includes a phase compensation circuit that calculates a compensation value, or correction torque after phase compensation, by carrying out phase compensation of the steering torque, and compensates for the current command value, and the control device restricts the phase compensation when the current command value is limited.

2. The electric power steering system according to claim 1, wherein,
   the phase compensation circuit includes a phase lag compensation circuit, and
   the phase lag compensation circuit calculates a first compensation value, or correction torque after phase lag compensation, by retarding a phase of the steering torque.

3. The electric power steering system according to claim 1, wherein,
   the phase compensation circuit includes a phase lead compensation circuit, and
   the phase lead compensation circuit calculates a second compensation value, or correction torque after phase lead compensation, by advancing a phase of the steering torque.

4. The electric power steering system according to claim 1, wherein,
   the control device limits the current command value when the absolute value of the current command value is larger than the current limit value and when an absolute value of a basic controlled variable, or a basic component of the current command value, is larger than the current limit value.

5. The electric power steering system according to claim 1, wherein,
   when the control device is restricting the phase compensation, the phase compensation is restricted when an absolute value of the steering torque is larger than an absolute value of the compensation value calculated by the phase compensation circuit.

6. The electric power steering system according to claim 1, wherein,
   when the control device is restricting the phase compensation, the phase compensation is restricted when an absolute value of a difference between the current command value and the compensation value calculated by the phase compensation circuit is larger than the current limit value.

* * * * *